(12) United States Patent
Nakai (10) Patent No.: US 11,099,352 B2
(45) Date of Patent: Aug. 24, 2021

(54) OPERATING APPARATUS

(71) Applicant: CANON KABUSHIKI KAISHA, Tokyo (JP)

(72) Inventor: Norio Nakai, Kawaguchi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 213 days.

(21) Appl. No.: 16/537,693

(22) Filed: Aug. 12, 2019

(65) Prior Publication Data

US 2020/0073080 A1    Mar. 5, 2020

(30) Foreign Application Priority Data

Aug. 28, 2018 (JP) ............................. JP2018-159408

(51) Int. Cl.
| | | |
|---|---|---|
| *G02B 7/02* | (2021.01) | |
| *G02B 7/09* | (2021.01) | |
| *G02B 7/10* | (2021.01) | |
| *H04N 5/232* | (2006.01) | |
| *G02B 15/14* | (2006.01) | |

(52) U.S. Cl.
CPC ............... *G02B 7/09* (2013.01); *G02B 7/023* (2013.01); *G02B 7/102* (2013.01); *G02B 15/14* (2013.01); *H04N 5/23296* (2013.01)

(58) Field of Classification Search
CPC .......... G02B 7/09; G02B 7/102; G02B 15/14; G02B 7/023; H04N 5/23296; G03B 2205/0053; G03B 17/56; G03B 3/10; G03B 5/00
USPC ......................................................... 359/823
See application file for complete search history.

(56) References Cited

U.S. PATENT DOCUMENTS

2011/0109788 A1\*   5/2011   Santo ................. H04N 5/23293
348/345

FOREIGN PATENT DOCUMENTS

JP              4508314 B2       7/2010

\* cited by examiner

*Primary Examiner* — James C. Jones
(74) *Attorney, Agent, or Firm* — Rossi, Kimms & McDowell LLP (57) ABSTRACT

Provided is an operating apparatus including: a main body in which a first groove is formed; an operating member which is rotatably held by the main body and in which a second groove is formed to face the first groove; an engaging member be movable and engaged with the first groove and the second groove; a first buffer member arranged at one end of a movable range of the engaging member in at least one of the first groove and the second groove, a second buffer member arranged at the other end of the movable range in at least one of the first groove and the second groove. The first buffer member and the second buffer member are different from each other in at least one of a material, a shape, a size, and an orientation thereof.

8 Claims, 7 Drawing Sheets

MOD END

INFINITY END

OPERATING APPARATUS

BACKGROUND OF THE INVENTION

Field of the Invention

The present invention relates to an operating apparatus.

Description of the Related Art

An operating apparatus configured to control movable optical elements to adjust optical characteristics of a lens apparatus includes a rotary operating member which enables manual multi-rotation operation. The operating apparatus includes a piece member or engaging member which engages with both of a slide groove formed in the rotary operating member and a spiral rotation restriction groove formed in a main body of the operating apparatus.

Further, there has been known an operating apparatus which is configured to change operation torque at an operation end portion through use of a slip mechanism (Japanese Patent No. 4508314). In the publication of Japanese Patent No. 4508314, the following structure is disclosed. The slip mechanism is provided between a main body of the operating apparatus and a rotary operating member, and slip resistance is set larger than operation torque of the rotary operating member, thereby alleviating a rapid change in torque at ends of a rotation operation.

In the operating apparatus described above, an impact sound generated by abutment of the piece member against an end portion of the rotation restriction groove may be disadvantageous for shooting with an image pickup apparatus including the lens apparatus. The configuration including the slip mechanism disclosed in Japanese Patent No. 4508314 may alleviate the impact sound but may be disadvantageous in terms of size and cost of the operating apparatus.

SUMMARY OF THE INVENTION

An aspect of the embodiment is directed to, for example, an operating apparatus beneficial in silence of an impact sound at an operation end portion thereof.

In order to achieve the above-mentioned object, an operating apparatus according to an embodiment of the present invention includes: a main body in which a first groove is formed; an operating member which is rotatably held by the main body and in which a second groove is formed to face the first groove; an engaging member movable and engaged with the first groove and the second groove; a first buffer member arranged at one end of a movable range of the engaging member in at least one of the first groove and the second groove, a second buffer member arranged at the other end of the movable range in at least one of the first groove and the second groove, herein the first buffer member and the second buffer member are different from each other in at least one of a material, a shape, a size, and an orientation thereof.

Further features of the present invention will become apparent from the following description of exemplary embodiments with reference to the attached drawings.

DESCRIPTION OF THE EMBODIMENTS

With reference to FIG. 1 to FIG. 6, description is made of a rotary operating mechanism of a lens operating apparatus according to an embodiment of the present invention.

The present invention relates to a mechanism configured to restrict a rotation operation range of a rotary operating part of an operating apparatus, which is configured to operate drive of a focus lens (movable optical member) of a lens apparatus, to a predetermined rotation angle range. In this embodiment, description is made of the rotary operating mechanism in an operating apparatus for focus. However, the present invention is not limited thereto. The present invention is applicable also to a rotary operating mechanism in the operating apparatus, which is configured to operate drive of, for example, zoom or macro.

In FIG. 1 to FIG. 4, a main body 1 of the lens operating apparatus receives a main shaft 2 which is turnably fitted and inserted thereinto. The main shaft 2 is coupled to and held by an operating grip 4 through intermediation of a coupling key 3. The operating grip 4 is rotatable together with the main shaft 2 relative to the main body 1 about the main shaft as an axis. An encoder 6 is fixed to the main body 1. A gear 7 is provided to the encoder 6, and is in mesh with a gear 5 provided to the main shaft 2. With this configuration, rotation of the operating grip 4 is transmitted to the encoder 6 via the main shaft 2, the gear 5, and the gear 7 so that the rotation of the operating grip 4 can be detected.

The operating grip 4 has, on its end surface facing the main body 1 and being perpendicular to a rotation axis of the main shaft, a straight groove (second groove) 4a extending in a radial direction. An end surface of the main body 1, which is orthogonal to the main shaft 2 and is opposed to the end surface of the operating grip 4 having the straight groove 4a, has a spiral groove (first groove) 1a. A stopper pin (engaging member) 8, which has a columnar shape and is slidably engaged with both of the spiral groove 1a and the straight groove 4a, is provided. A rotatable range of the operating grip 4 is defined with a slidable range of the stopper pin 8 relative to both of the spiral groove 1a and the straight groove 4a. An infinity end stopper (second buffer member) 9, which is a rubber member having a columnar shape, is provided at a radially outer end portion (the other end) of the spiral groove 1a, and a MOD end stopper (first buffer member) 10, which is a rubber member having a columnar shape, is provided at a radially inner end portion (one end) of the spiral groove 1a.

Figure 5:
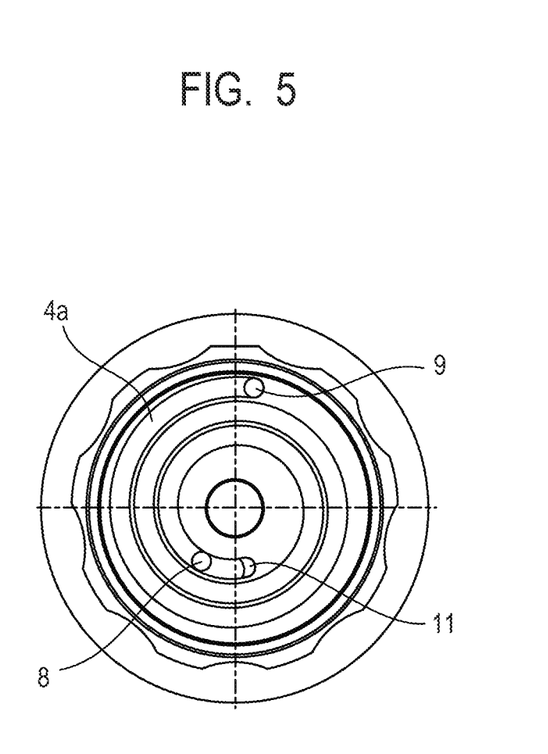
FIG. 5 is a front transparent view for illustrating a case in which the MOD end stopper in the embodiment of the present invention has a crescent sectional shape.

Further, in FIG. 5, in place of the MOD end stopper 10, a MOD end stopper 11 having a crescent sectional shape is provided at the radially inner end portion of the spiral groove 1a. Further, in FIG. 6, in place of the MOD end stopper 10, a hard MOD end stopper core member 12 covered with a soft MOD end stopper covering member 13 is provided at the radially inner end portion of the spiral groove 1a.

With the configuration described above, the rotation of the operating grip 4 is transmitted to the encoder 6 via the main shaft 2, the gear 5, and the gear 7, and a rotation angle is detected by the encoder 6. Then, in accordance with an output signal of the encoder 6, a focus mechanism for a lens (not shown), which is externally connected, is driven.

Figure 1:
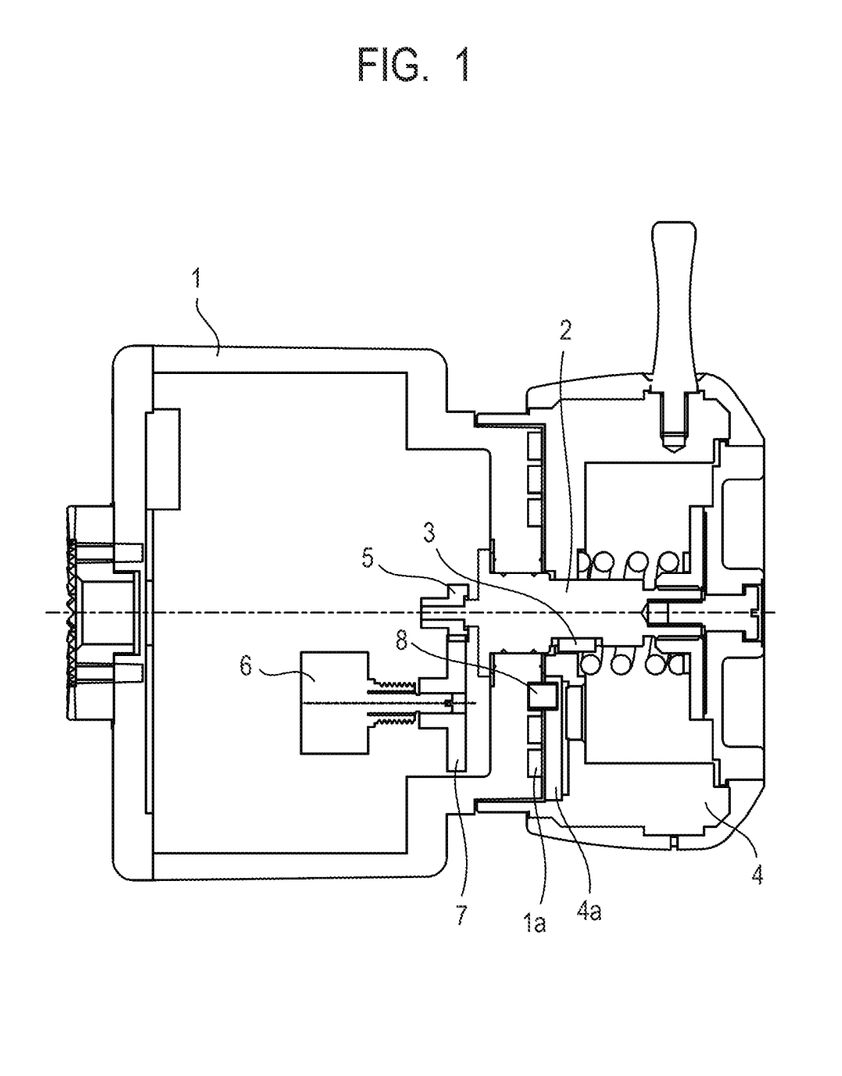
FIG. 1 is a side sectional view for illustrating main parts of a lens operating apparatus according to an embodiment of the present invention.
Figure 2A:
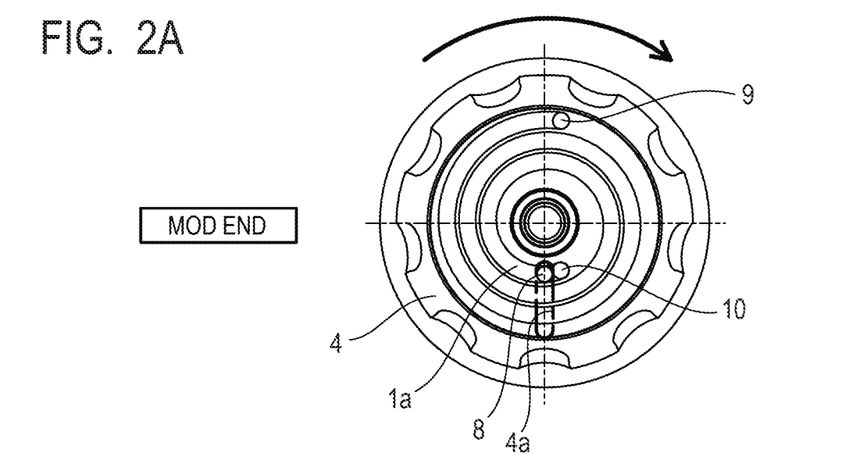
FIG. 2A is a front transparent view for illustrating actuation and rotation restriction of the lens operating apparatus according to the embodiment of the present invention.
Figure 2B:
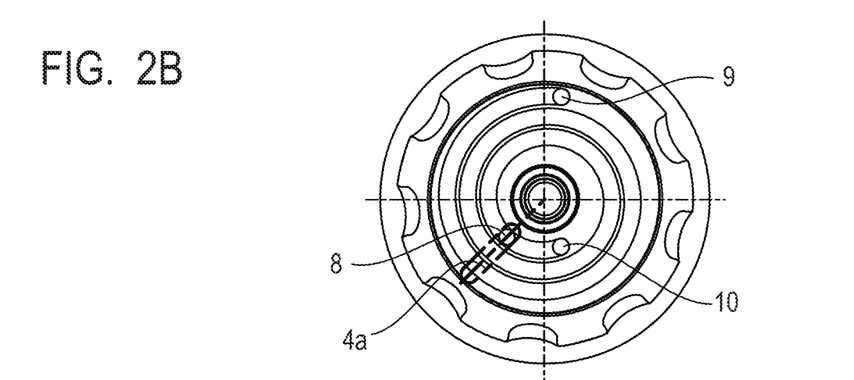
FIG. 2B is a front transparent view for illustrating actuation and rotation restriction of the lens operating apparatus according to the embodiment of the present invention.
Figure 2C:
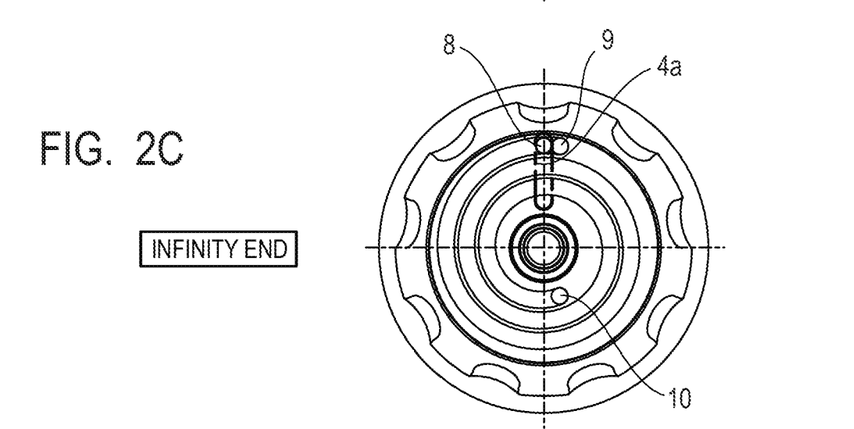
FIG. 2C is a front transparent view for illustrating actuation and rotation restriction of the lens operating apparatus according to the embodiment of the present invention.

When the operating grip 4 is operated to rotate in a clockwise direction as viewed in an axis direction of the main body 1 (from the right side in FIG. 1) as indicated by the arrow illustrated in FIG. 2A, the focus mechanism for a lens (not shown) is manually operated toward a remote side from the MOD end (FIG. 2A) via an intermediate focus position (FIG. 2B) to the infinity end (FIG. 2C) through rotation by two and a half turns.

Figure 3:
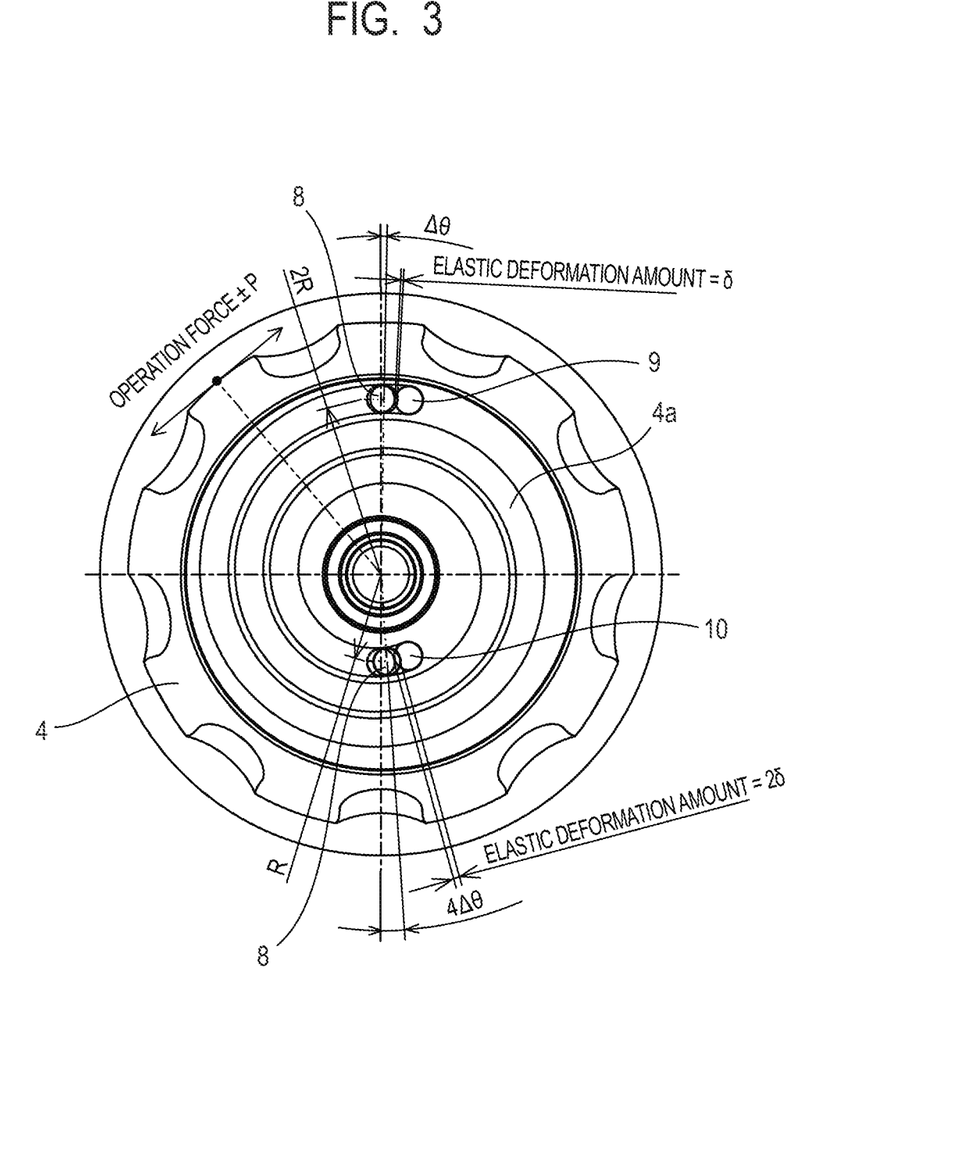
FIG. 3 is a front transparent view for illustrating a relationship between an operation force and a stopping angle in a case in which a minimum object distance end (MOD end) stopper and an infinity end stopper are formed of the same component.

As illustrated in FIG. 3, a distance between the radially outer end portion of the spiral groove 1a and a rotation center of the main shaft 2 (2R, second distance) is twice as large as a distance between the radially inner end portion of the spiral groove 1a and the rotation center (R, first distance). When an operation force (P) in the clockwise direction is applied to the operating grip 4 at the infinity end, and an operation force (−P) in a counterclockwise direction is applied at the MOD end, according to the Hertz's elastic deformation formula, an elastic deformation amount δ between parallel columns is proportional to a pressing force.

When two elastic columns are held in contact with each other, a relationship among a width of contact surfaces, a force acting between the columns, and approach and separation between centers of the columns is expressed by the following Hertz's elastic deformation formula, according to the Hertz's theory.

$$\delta = \frac{2F}{\pi L}\left\{\frac{1-v_1^2}{E_1}\left(\ln\frac{4R_1}{\alpha}-\frac{1}{2}\right)+\frac{1-v_2^2}{E_2}\left(\ln\frac{4R_2}{\alpha}-\frac{1}{2}\right)\right\} \quad \text{[Formula 1]}$$

Figure 7:
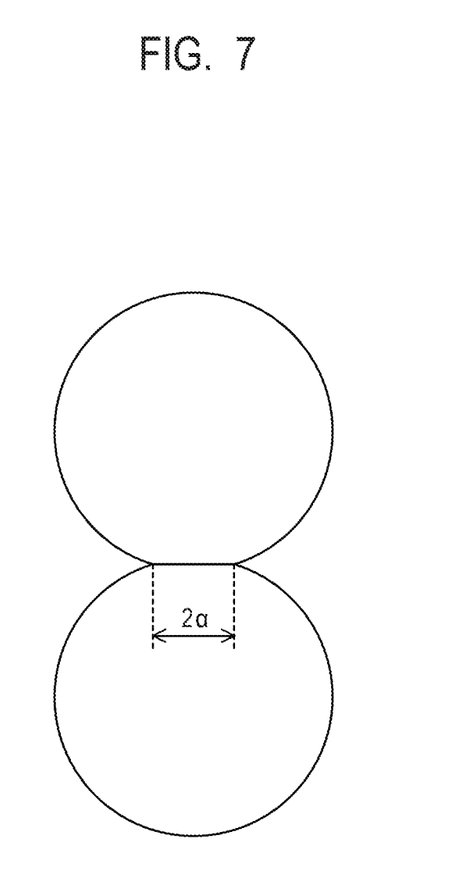
FIG. 7 is an explanatory view for illustrating a contact-surface half width in a case in which two elastic columns are held in contact with each other according to Hertz's theory.

In Formula 1, a radius of a first column (for example, stopper pin 8) is represented by $R_1$, a radius of a second column (for example, infinity end stopper or MOD end stopper) is represented by $R_2$, an elastic deformation amount between the first column and the second column is represented by δ, a pressing force between the first column and the second column is represented by F, an abutment length between the first column and the second column is represented by L, a modulus of longitudinal elasticity (Young's modulus) of a first column material is represented by $E_1$, a modulus of longitudinal elasticity (Young's modulus) of a second column material is represented by $E_2$, a Poisson's ratio of the first column material is represented by $v_1$, and a Poisson's ratio of the second column material is represented by $v_2$. Further, α represents a contact-surface half width of the two elastic columns as illustrated in FIG. 7, and is expressed by the following formula.

$$\alpha = 2\left(\frac{FR_1R_2E_1E_2}{L\pi(R_1+R_2)\{(1-v_1^2)E_2+(1-v_2^2)E_1\}}\right) \quad \text{[Formula 2]}$$

When the infinity end stopper 9 and the MOD end stopper 10 are formed of the same component, and the same operation force P is applied, the MOD end stopper 10 is bent by the amount twice as large as that of the infinity end stopper 9. That is, the elastic deformation amount at the infinity end is δ, whereas the elastic deformation amount at the MOD end is 2δ. According to conversion into an operation angle of the operating grip 4, as compared to an angle deviation at the infinity end (Δθ), an angle deviation at the MOD end is four times (4Δθ) as large as the angle deviation at the infinity end. In this case, an operator who operates the operating grip 4 feels discomfort with respect to the angle deviation of four times depending on the difference in operating directions.

Figure 4:
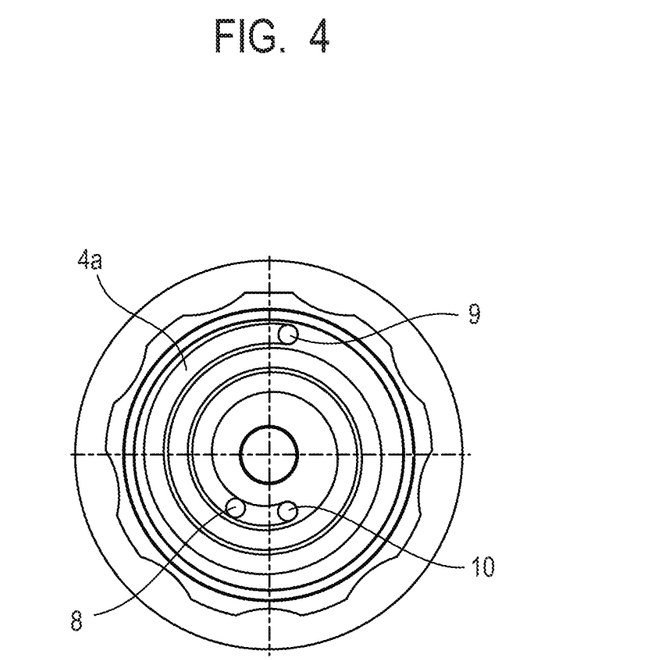
FIG. 4 is a front transparent view for illustrating a case in which the MOD end stopper and the infinity end stopper in the embodiment of the present invention have the same columnar shape and in which hardness of the MOD end stopper is increased.

In the embodiment of the rotary operating mechanism of the lens operating apparatus according to the present invention illustrated in FIG. 4, the MOD end stopper 10 is a rubber member having rubber hardness (first stiffness) which is four times as large as stiffness (second stiffness) of the infinity end stopper 9. With this configuration, the unevenness in bending amount described above is eliminated, and hence conditions of abutment against the operating ends of the operating grip 4 at the closed end and the infinity end, which are felt by an operator who operates the operating grip 4, can be substantially matched.

In the embodiment of the rotary operating mechanism of the lens operating apparatus according to the present invention illustrated in FIG. 5, when a recessed surface of the MOD end stopper 11 is brought into abutment against the stopper pin 8, the elements $R_1$ and $R_2$ in the Hertz's elastic deformation formula are inverted. Thus, the deformation amount is adjustable in accordance with a curvature of the recessed surface. Even with this configuration, conditions of abutment against the operating ends of the operating grip 4 at the closed end and the infinity end, which are felt by an operator who operates the operating grip 4, can be substantially matched.

Figure 6:
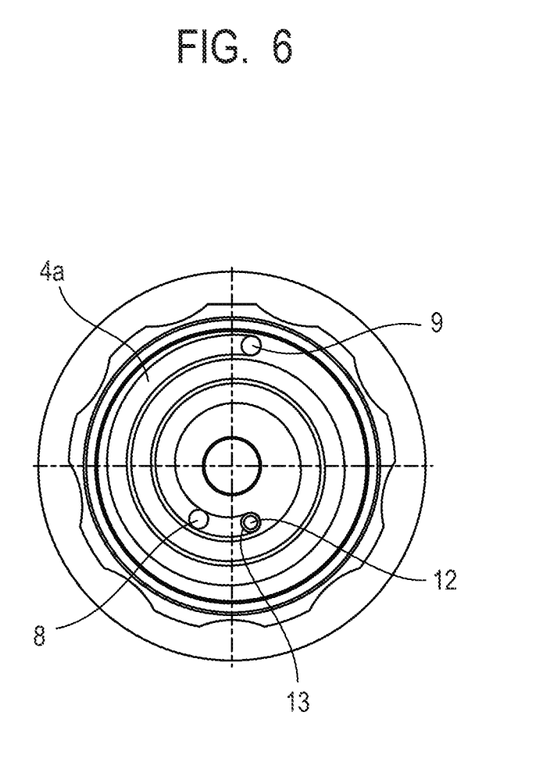
FIG. 6 is a front transparent view for illustrating a case in which the MOD end stopper in the embodiment of the present invention is made of a composite material.

In the embodiment illustrated in FIG. 6, the stiffness of the MOD end stopper made of a composite material can be adjusted through combinations of, for example, a hardness and a sectional diameter of the MOD end stopper core member 12 made of a hard elastic material and a hardness and a thickness of the MOD end stopper covering member 13 made of a soft elastic material. When the MOD end stopper 10 and the infinity end stopper 9 are formed so as to be different from each other in at least one of a material, a shape, a size, and an orientation, balance in stiffness of both stoppers can be adjusted. That is, even in a case of using columnar stoppers having the same material and shape, adjustment can be made through changes in radius. Even in a case of using stoppers having completely the same columnar shape with a semicircular sectional shape, balance in stiffness of both the stoppers may be adjusted through formation of the abutment surface into a cylindrical surface of a column with a semicircular sectional shape or a flat surface of a column with a semicircular sectional shape. That is, through selection of a hardness or a shape and a configuration of the elastic material forming the MOD end stopper, the conditions of abutment at the infinity end and the MOD end being both ends of the rotation operation of the operating grip 4 can be adjusted and conditioned.

The rotatable range of the operating grip 4 is defined with a movable range (slidable range) of the stopper pin 8 relative to both of the spiral groove 1a and the straight groove 4a. The stopper pin 8 may be brought into abutment against both ends of the spiral groove 1a and the straight groove 4a to limit the slidable range. Moreover, the stopper pin 8 may be brought into abutment against an end of any one of the spiral groove 1a and the straight groove 4a to define the rotation range. In the embodiment described above, in any of the rotation directions of the operating grip 4, the stopper pin 8 is not brought into abutment against the end of the straight groove 4a but is brought into abutment against the end of the spiral groove 1a to thereby define the rotation range. That is, the spiral groove 1a and the straight groove 4a are configured so that the stopper pin 8 is brought into abutment against the end of any one of the grooves in which an angle formed between the extending direction of the groove and the rotation direction is smaller to thereby define the rotation range. With this configuration, as compared to the case in which the stopper pin 8 is brought into abutment against the end of the straight groove 4a to limit the movable range, the rotatable range can be more clearly defined. As compared to the case in which the stopper pin 8 is brought into abutment against the ends of both of the spiral groove 1a and the straight groove 4a, the rotatable range can be more clearly defined.

According to the present invention, there can be provided a lens operating apparatus, which is capable of achieving both the alleviation of an impact sound at both ends of the manual rotation operation and the stabilization of the stopping position for the rotary operating member with a simple mechanism and enables downsizing and reduction in cost of the apparatus. In particular, the present invention is capable of exerting more conspicuous effect in a lens operating apparatus including a manual rotary operating part having a rotation angle range larger than 360 degrees.

In the foregoing, description is made of the exemplary embodiment of the present invention. However, adjustment of the MOD end (inner-end) stopper in the embodiment can be replaced with adjustment of the infinity end (outer-end) stopper. Further, the spiral groove can be replaced with any other rotation restriction groove having both ends which are different in distance from the rotation center.

In the embodiment, the spiral groove is formed in the main body, and the straight groove is formed in the operating grip. However, the present invention is not limited to this configuration. It is only required that the spiral groove be formed in one of the main body and the operating grip and the straight groove be formed in the other of the main body and the operating grip. The straight groove may be formed in the main body, and the spiral groove may be formed in the operating grip.

Further, in the embodiment, both of the surface of the main body having the spiral groove and the surface of the operating grip having the straight groove are flat surfaces. However, the present invention is not limited to this configuration. The surfaces of the main body and the operating grip opposed to each other having the grooves for allowing the stopper pin to slide therein may have a truncated conical shape or a cylindrical shape. The shapes of the cross sections of the surfaces of the main body and the operating grip opposed to each other including the rotation axis of the operating grip may be the surface including a curved line. That is, the present invention is not limited to the embodiment, and various modifications and changes can be made within the gist of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-159408, filed Aug. 28, 2018, which is hereby incorporated by reference herein in its entirety.

What is claimed is:

1. An operating apparatus comprising:
a main body in which a first groove is formed;
an operating member which is rotatably held by the main body and in which a second groove is formed to face the first groove;
an engaging member movable and engaged with the first groove and the second groove;
a first buffer member arranged at one end of a movable range of the engaging member in at least one of the first groove and the second groove,
a second buffer member arranged at the other end of the movable range in at least one of the first groove and the second groove,
wherein the first buffer member and the second buffer member are different from each other in at least one of a material, a shape, a size, and an orientation thereof.

2. The operating apparatus according to claim 1, wherein the first buffer member and the second buffer member are different from each other in stiffness.

3. The operating apparatus according to claim 1, wherein at least one of the first buffer member and the second buffer member includes a composite material.

4. The operating apparatus according to claim 1, wherein a distance between a rotation axis of the operating member and the one end and a distance between the rotation axis and the other end are different from each other.

5. The operating apparatus according to claim 1, wherein one of the first buffer member and the second buffer member, which is disposed at a first distance from a rotation axis of the operating member has a first stiffness, and the other of the first buffer member and the second buffer member, which is disposed at a second distance larger than the first distance from the rotation axis has a second stiffness, and the first stiffness is higher than the second stiffness.

6. The operating apparatus according to claim 1, wherein one of the first groove and the second groove is formed as a spiral groove having a center at a rotation axis of the operating member, and the other of the first groove and the second groove is formed as a groove extending in a radial direction with respect to the rotation axis.

7. The operating apparatus according to claim 6, wherein the first groove is formed as the spiral groove, and the second groove is formed as the groove extending in the radial direction.

8. The operating apparatus according to claim 6, wherein the second groove is formed as the spiral groove, and the first groove is formed as the groove extending in the radial direction.

* * * * *